(12) United States Patent
Dyck et al.

(10) Patent No.: US 7,008,342 B2
(45) Date of Patent: Mar. 7, 2006

(54) ELECTRO-MECHANICAL CONTINUOUSLY VARIABLE TRANSMISSION

(75) Inventors: Gerald Dyck, Abbotsford (CA); Paul Dries, Coquitlam (CA); Mohsen Bagherpour, North Vancouver (CA); John Czepak, Burnaby (CA)

(73) Assignee: Silvatech Global Systems Ltd., Tortola (VG)

( * ) Notice: Subject to any disclaimer, the term of this patent is extended or adjusted under 35 U.S.C. 154(b) by 278 days.

(21) Appl. No.: 10/641,137

(22) Filed: Aug. 15, 2003

(65) Prior Publication Data

US 2005/0035601 A1    Feb. 17, 2005

(51) Int. Cl.
    *H16H 3/72*    (2006.01)
(52) U.S. Cl. .......................................... 475/5
(58) Field of Classification Search ................ 475/5
    See application file for complete search history.

(56) References Cited

U.S. PATENT DOCUMENTS

| | | |
|---|---|---|
| 1,307,230 A | 6/1919 | Von Zweigbergk et al. |
| 2,050,185 A | 8/1936 | Kibler |
| 2,578,837 A | 12/1951 | Raney |
| 3,699,351 A | 10/1972 | Addie |
| 3,799,284 A | 3/1974 | Hender |
| 4,335,429 A | 6/1982 | Kawakatsu |
| 4,579,019 A | 4/1986 | Gabriele |
| 4,779,486 A | 10/1988 | Schumacher |
| 5,285,111 A | 2/1994 | Sherman |
| 5,419,406 A | 5/1995 | Kawamoto et al. |
| 5,433,282 A | 7/1995 | Moroto et al. |
| 5,509,491 A | 4/1996 | Hall, III |
| 5,558,588 A * | 9/1996 | Schmidt .......................... 475/5 |
| 5,558,589 A | 9/1996 | Schmidt |
| 5,577,973 A | 11/1996 | Schmidt |
| 5,643,119 A | 7/1997 | Yamaguchi et al. |
| 5,697,466 A | 12/1997 | Moroto et al. |
| 5,704,440 A | 1/1998 | Urban et al. |
| 5,791,427 A | 8/1998 | Yamaguchi |
| 5,823,281 A | 10/1998 | Yamaguchi et al. |
| 5,931,757 A | 8/1999 | Schmidt |
| 5,935,035 A | 8/1999 | Schmidt |
| 6,003,626 A | 12/1999 | Ibaraki et al. |
| 6,022,287 A | 2/2000 | Klemen et al. |
| 6,098,735 A | 8/2000 | Sadarangani et al. |
| 6,209,672 B1 | 4/2001 | Severinsky |
| 6,358,173 B1 | 3/2002 | Klemen et al. |
| 6,371,878 B1 | 4/2002 | Bowen |
| 6,405,818 B1 | 6/2002 | Anthony et al. |
| 6,428,438 B1 | 8/2002 | Bowen |
| 6,478,705 B1 | 11/2002 | Holmes et al. |
| 6,551,208 B1 * | 4/2003 | Holmes et al. ................ 475/5 |
| 6,592,484 B1 | 7/2003 | Tsai et al. |

FOREIGN PATENT DOCUMENTS

| | | |
|---|---|---|
| CA | 2435450 | 8/2002 |
| GB | 399223 | 10/1933 |
| GB | 624179 | 5/1949 |
| GB | 2275309 | 8/1994 |

* cited by examiner

*Primary Examiner*—Dirk Wright
(74) *Attorney, Agent, or Firm*—Vermette & Co.

(57) ABSTRACT

The invention comprises an electro-mechanical continuously variable transmission (EMCVT) that uses a planetary gear system to provide a combination of electric and mechanical power for a vehicle or for stationary equipment. The EMCVT includes a clutch and brake system that allows power from a energy storage unit to be combined with the main power input (typically an engine) to provide a torque output greater than that available from the main power input alone.

10 Claims, 9 Drawing Sheets

| Operation Mode | | Batt / Cap Bank Status 130/140 | Engine Operation Required? | Clutches Engaged: Lockup Brake 80 | Mech Drv Clutch 90 | Gen Input Clutch 160 | Gen Output Clutch 170 | Split Speed Clutch 180 |
|---|---|---|---|---|---|---|---|---|
| Forward: | | | | | | | | |
| 1 | FULL ELECTRICAL | 2-MOTOR | Draining | | | | Y | |
| 2 | FULL ELECTRICAL + ENGINE | 2-MOTOR + ENGINE | Y | | Y | | Y | Y |
| 3 | ECONOMY | 1-MOTOR | Draining | | | | | |
| 4 | PARALLEL | EMCVT | Charging | | Y | Y | | |
| 5 | FULL MECHANICAL | ENGINE | Y | Y | Y | Y | | |
| Reverse: | | | | | | | | |
| 1 | FULL ELECTRICAL | 2-MOTOR REVERSE | Draining | | | | Y | |
| 2 | ECONOMY | 1-MOTOR REVERSE | Draining | | | | | |
| 3 | PARALLEL | EMCVT REVERSE | Y | | Y | Y | | |
| Braking: | | | | | | | | |
| 1 | MAXIMUM REGEN | 2-GENERATOR BRAKING | Charging (Heavy Braking) | | | Y | Y | |
| 2 | LIGHT REGEN | 1-GENERATOR BRAKING | Charging (Light Braking) | | Y | | | |
| 3 | PARALLEL | HMCVT BRAKING | Charging + Engine Braking | Y | Y | | | |
| 4 | FULL ENGINE BRAKING | ENGINE BRAKING | Fully Charged | Y | Y | | | |
| Engine Starting: | | | | | | | | |
| 1 | OUTPUT STOPPED | With Vehicle Stopped | Partially Charged | Starting | | Y | | Y |
| 2 | OUTPUT IN MOTION | Vehicle in Motion | Partially Charged | Starting | | Y | | Y |

Figure 9

ELECTRO-MECHANICAL CONTINUOUSLY VARIABLE TRANSMISSION

FIELD

This invention relates to a drive system useful as a vehicle propulsion system or stationary equipment drive, combining mechanical and electric power systems.

BACKGROUND

Electric drive systems have been commonly used for large vehicles or stationary equipment. However, as the output/input speed ratio increases, the electric motor & generator no longer operate at their optimum operating speeds. This reduces the overall efficiency of the drive at the upper half of the drive's operating range. This problem may be overcome by having multiple gear settings to keep the motors and generators operating at or near their optimum speeds, but the complexity of the resulting transmission negates the benefits of using an electric drive.

An alternative to an electric drive system is a mechanically driven system. However, conventional mechanical drive systems are limited to discrete gear ratios, which do not allow for infinite speed ratios as found in electric drives. A great deal of power management between the engine and the transmission at all output speeds is necessary for transmission effectiveness. A purely mechanical drive is inadequate to ensure the efficient use of the engine's available power due to the discrete speed ratios, while a purely electric drive has inherently lower efficiency at higher operational speeds.

With the increasing costs of fuel and more stringent emissions requirements, there is a need for more efficient drive systems for large and small vehicles, as well as stationary equipment, to replace traditional electric and mechanical drive systems.

It is an object of this invention to provide a more efficient drive system for large and small vehicles and stationary equipment by combining electric and mechanical power systems. It is a further object of this invention to provide a transmission system for optimizing use of combined drive systems.

SUMMARY

The invention comprises an electro-mechanical continuously variable transmission (EMCVT) that uses a planetary gear system to provide a combination of electric and mechanical power for a vehicle or for stationary equipment. The EMCVT includes an input shaft to receive power from an enging, an output shaft, a generator, a planetary gear set coupled to the input shaft, the output shaft and to an input of the generator and a motor coupled to the output shaft by a gear set having a fixed speed ratio. An energy storage device is coupled to the generator and to the motor. The energy storage device is operative to accept power from and supply power to the generator and the motor. A controller coupled to the motor, generator and battery is operative to regulate power flow between the energy storage device and the generator, the energy storage device and the motor and between the generator and the motor. A split speed clutch is coupled to two elements of the planetary gear set and is operative to lock the two elements together and permit direct transfer of all power between the generator and the input shaft. A generator lock up brake is coupled to the generator and is operative to lock out the electric branch and force all power through the mechanical branch when the transmission output is operating at a pre-selected percentage of its maximum speed. A generator output clutch is coupled between the generator and the motor and is operative in a locked mode to lock the generator to the motor. A mechanical drive clutch is coupled between one element of the planetary gear set and the output and is operative to lock together the one element of the planetary gear set to the output allowing the planetary gear set to split power between the generator, the input shaft and the output shaft.

The EMCVT may also include a range splitter system to expand the operating parameters of the vehicle or stationary equipment.

The EMCVT may further include a regenerative steering system to control power distribution between the two ends of the main output shaft.

While the EMCVT can provide output in both forward and reverse direction, it may optionally include a reversing gear system coupled at either the main power input or the main output shaft. The reversing gear system allows the EMCVT to provide an output in the reverse direction while the components in the electrical and mechanical operate in the same fashion as the forward direction.

Preferably, the split speed clutch is engaged, allowing the generator to act as a starting motor and send power to the input.

BRIEF DESCRIPTION OF THE DRAWINGS

The invention itself, both as to organization and method of operation, as well as additional objects and advantages thereof, will become readily apparent from the following detailed description when read in connection n with the accompanying drawings.

DETAILED DESCRIPTION OF THE INVENTION

Figure 1:
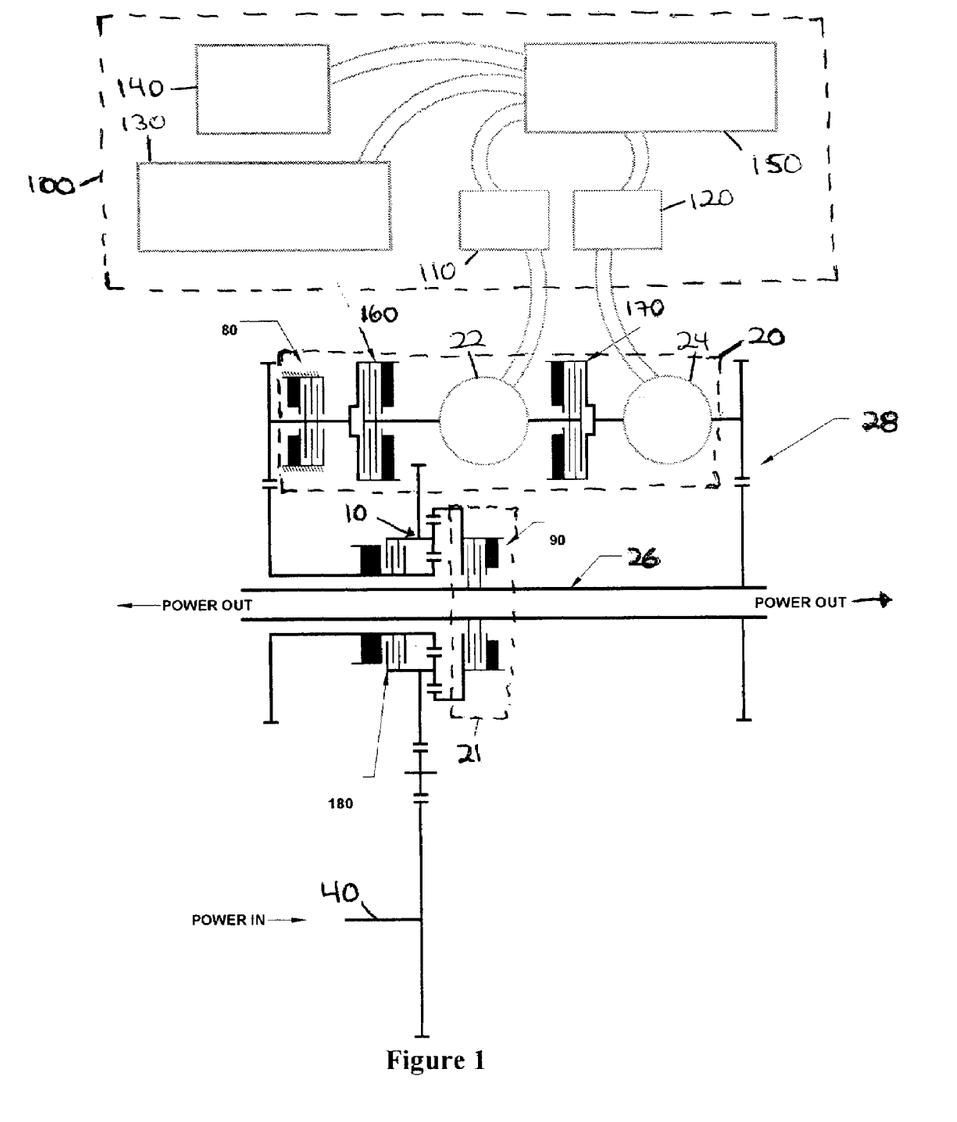
FIG. 1 shows a block diagram of an EMCVT with two outputs, a parallel shaft configuration, and an SRC planetary gear set.

The electro-mechanical continuously variable transmission (EMCVT) shown in FIG. 1 is designed to split power from an input 40 between an electric drive branch 20, using an electric generator 22 and an electric motor 24, and a parallel mechanical drive branch 21, using shafts and/or gears, recombining the power from each branch into a single main output 26.

Figure 2:
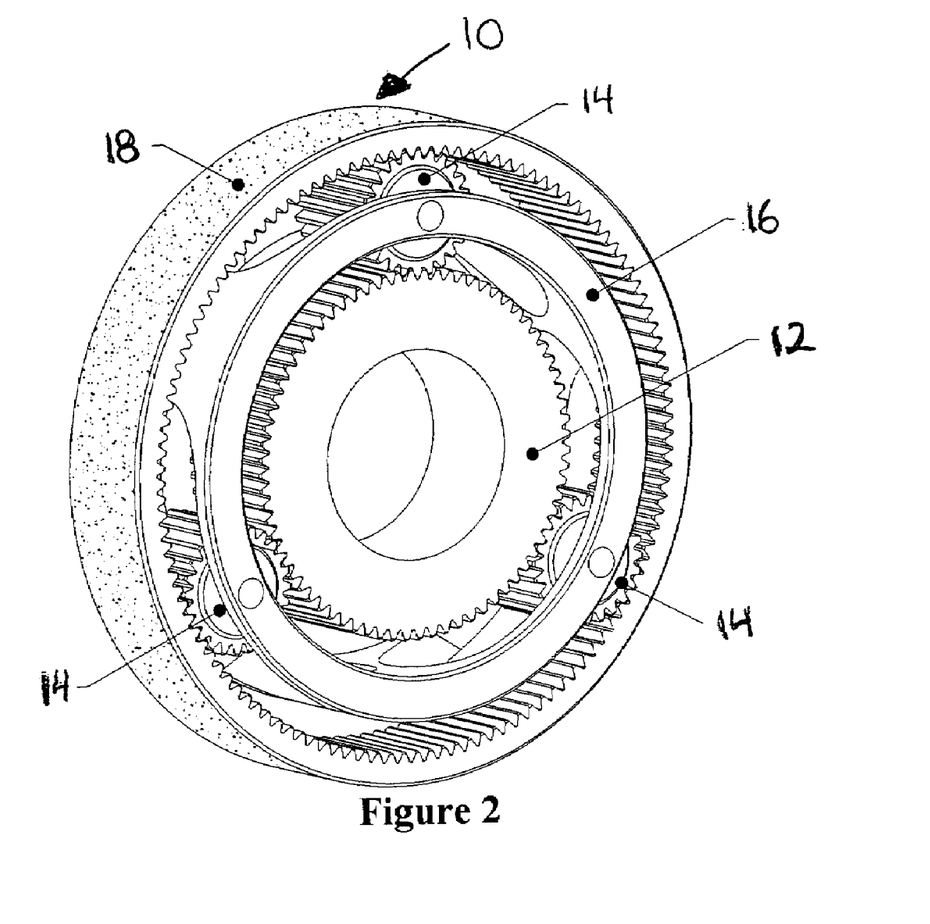
FIG. 2 shows a simplified diagram of a three-planet planetary gear set.

A simple planetary gear set 10, as shown in more detail in FIG. 2, consisting of sun gear 12, planet gear(s) 14, carrier 16, and ring gear 18 is used to split power from input 40, derived from an internal combustion engine or other primary power source (not shown), between the electrical drive branch 20 and the mechanical drive branch 21.

Although six planetary element combinations are possible, the preferred embodiment is an SRC configuration i.e. sun gear 12 connected to the electrical branch 20, ring gear 18 connected to the mechanical branch 21 and the carrier 16 connected to the input 40 (see FIG. 1).

The electrical drive branch consists of a primary generator 22, a primary motor 24, and is connected to an energy storage system 100. The energy storage system consists of a battery bank 130, an optional capacitor bank 140, inverters 110 and 120 and a controller 150. Power flow is normally directed between the generator 22 and the motor 24 by a controller 150. The inverters 110 and 120 match the differing power characteristics (current, current type, voltage and frequency) of the generator 22, motor 24, battery bank 130 and capacitor bank 140. The battery bank 130 may be charged in one of 2 ways: by absorbing power from the input 40 or by absorbing energy from braking.

Figure 3:
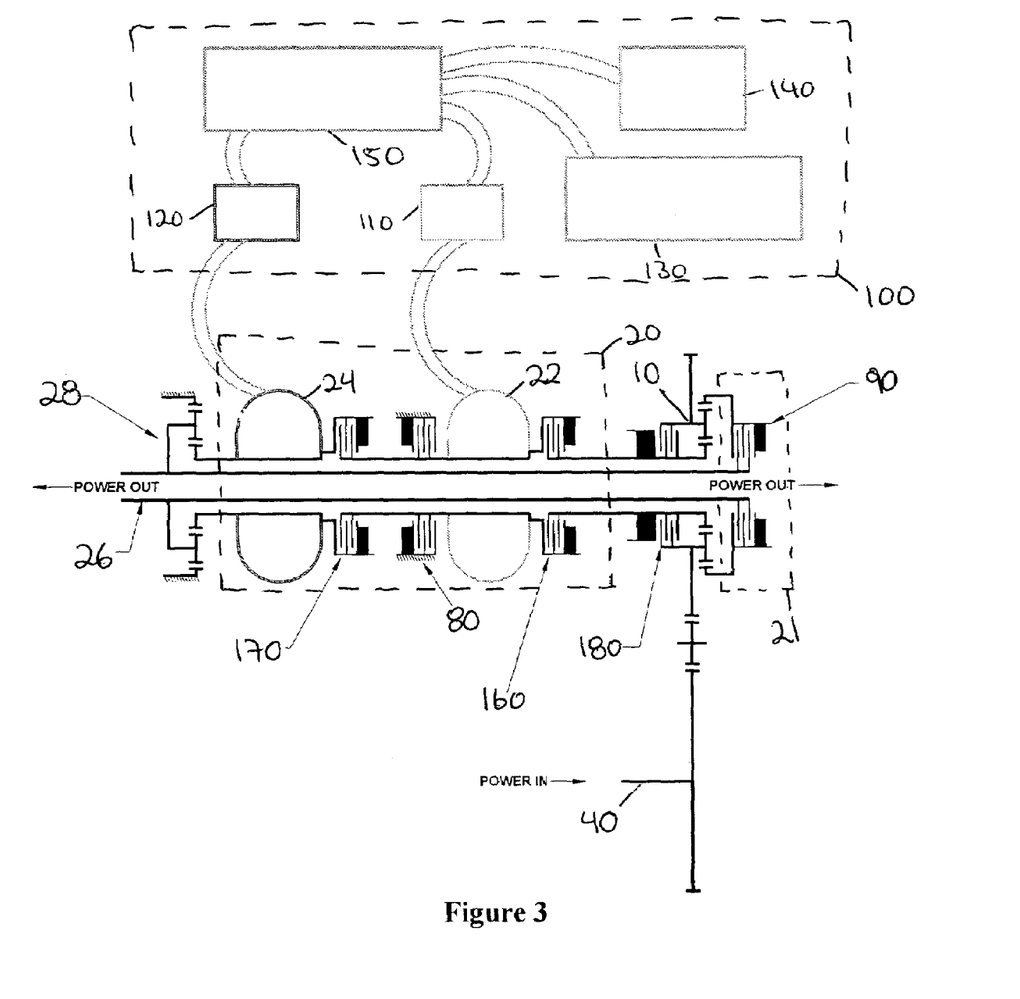
FIG. 3 shows a block diagram of an EMCVT with two outputs, a coaxial shaft configuration and an SRC planetary gear set.
Figure 4:
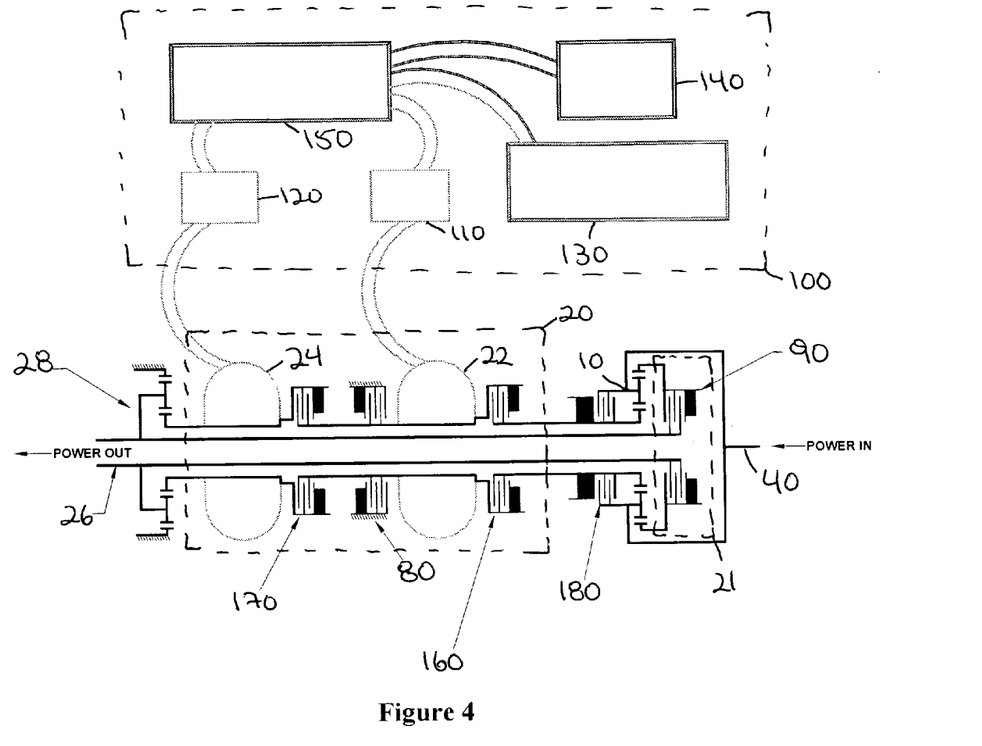
FIG. 4 shows a block diagram of an EMCVT with one output, a coaxial shaft configuration and an SRC planetary gear set.

The combiner gear set 28 couples the electrical branch 20 to the main output shaft 26. The combiner gear set 28 is shown as a pair of spur gears, however, a planetary gear set (as shown in FIGS. 3 and 4) may also be used for more advanced power control systems. Power from the electrical branch 20 is combined with power from the mechanical branch 21 at this point.

The mechanical drive branch 21 is shown as a simple shaft directly connecting one of the elements of the planetary gear set 10 to the main output shaft 26, but may be a more extensive assembly of shafts and gears to accommodate the physical layout requirements of the transmission.

Several brakes and clutches shown in FIG. 1 may be used to control various aspects of the power distribution between the mechanical 21 and electrical 20 branches. The lockup brake 80 selectively connects/disconnects the electrical output element (sun gear 12 in the SRC configuration) of the planetary gear set 10 to ground, preventing that element of the planetary gear set 10 from transmitting any power.

The generator input clutch 160 selectively connects/disconnects the electrical output element of the planetary gear set 10 to the primary generator 22. Engaging the input clutch 160 to connect the electrical output element (sun gear 12 in the SRC configuration) of planetary gear set 10 also allows the primary generator 22 to absorb power from the planetary gear set 10.

The generator output clutch 170 selectively connects/disconnects the primary generator 22 to/from the combiner gear set 28. This allows the generator 22 to supplement power provided by the primary motor 24 to the combiner gear set 28.

The mechanical drive clutch 90 selectively connects/disconnects the mechanical output (ring gear 18 in the SRC configuration) of the planetary gear set 10 to/from the mechanical branch.

The split speed clutch 180 selectively locks/unlocks two elements of the planetary gear set 10 together preventing any differential speed between the elements. During certain operating modes, it is desirable to lock all three elements (sun 12, ring 18, carrier 16) of the planetary gear set 10 together. In FIG. 1, the split speed clutch 180 is located between the carrier 16 and sun gear 12. The clutch 180 may alternatively be located between the sun gear 12 and ring gear 18 or between the ring gear 18 and carrier 16.

Energizing the split speed clutch 180 locks the carrier 16 and sun gear 12 together. Due to the nature of the planetary gear set 10, the ring gear 18 is forced to turn at the same speed as the other two elements. A reaction torque is now only required at two of the three elements and the planetary gear set 10 is now acting as a rigid coupling between three input/outputs. The ability to lock the planetary gear set 10 in this manner is required for "Burst" mode as well as the engine starting modes described below.

Energy Storage System

Incorporating an energy storage system 100 in the electrical 20 branch can increase the performance and efficiency of the transmission in two ways: energy normally lost during braking by conventional mechanical methods may be recovered for later use; and energy stored in the system 100 may be applied to the transmission output 26 at the same time as peak engine power is applied resulting in a higher power output than is possible with the engine alone.

During periods of low power demand at the main output 26, some of the power drawn from the engine at input 40 may be directed to the battery bank 130 by the controller 150 using generator 22 to convert it into electrical power. Engine output power will have to be slightly increased to accommodate the extra power demand. The specific requirements for charging are covered in the discussion of the various operating modes.

During braking operations, the energy normally absorbed by conventional brakes may be directed back through the transmission to the engine (engine braking). The motor 24 functions as a generator and the generator 22 functions as a motor. Power that normally flows back to the generator 22 may be diverted to the battery bank 130 by the controller 150. Under heavy or prolonged braking conditions, the battery charge rate or overall capacity may be exceeded. Under these conditions, the excess power can be directed back to the engine or to a capacitor bank 140, which has a much higher charging rate than the battery bank 130. When braking demands cease, energy stored in the capacitor bank 140 may be used to charge the battery bank 130. The various braking procedures are discussed in more detail below.

Power from the battery bank 130 may be used to supplement the power drawn from the engine at input 40 during periods of high demand. Consequently, the engine may be reduced to a more economical size to meet average operating conditions while relatively high performance peaks may still be obtained. This "boost" mode is discussed under forward operating modes below.

Layout

The EMCVT core is shown in, but not limited to, three basic layouts.

FIG. 1 shows a parallel shaft arrangement with two outputs. The planetary gear set 10 is arranged coaxially around the main output shaft 26, and the primary generator 22 and primary motor 24 are arranged parallel shaft to the main output shaft 26. The input 40 uses a separate parallel shaft. The input 40 may alternatively use a shaft perpendicular to the main output shaft 26, driving the input to the planetary gear set 10 through a bevel gear set (not shown). The parallel shaft arrangement is suited but not limited to an application where transmission width is an issue but major components may be stacked vertically or front to back. An example would be the drive for a tracked vehicle with limited width between tracks.

FIG. 3 shows a coaxial shaft arrangement with two outputs and parallel shaft input. Here the components of the electrical 20 and mechanical 21 branches are arranged coaxially around the main output shaft 26, except for energy storage system 100, which is located separately. Combiner gear set 28 is a planetary gear set. The input 40 uses a shaft parallel to the main output shaft 26. The input may alternatively use a shaft perpendicular to the main output shaft 26, driving the input to the planetary gear set 10 through a bevel gear set. The coaxial, dual output arrangement is suited but not limited to an application requiring a relatively compact transmission with little or no width limitation. An example would be a front wheel drive vehicle utilizing a transverse engine.

FIG. 4 shows a coaxial shaft arrangement with one output and a coaxial input shaft. The components are arranged are in FIG. 3, except that power input 40 is set at one end of main output shaft 26, leaving only one end for output. This arrangement creates a long, narrow inline power train suited to long narrow drive bays. An example of this would be a conventional front engine, rear wheel drive vehicle.

Operation

Figure 8:
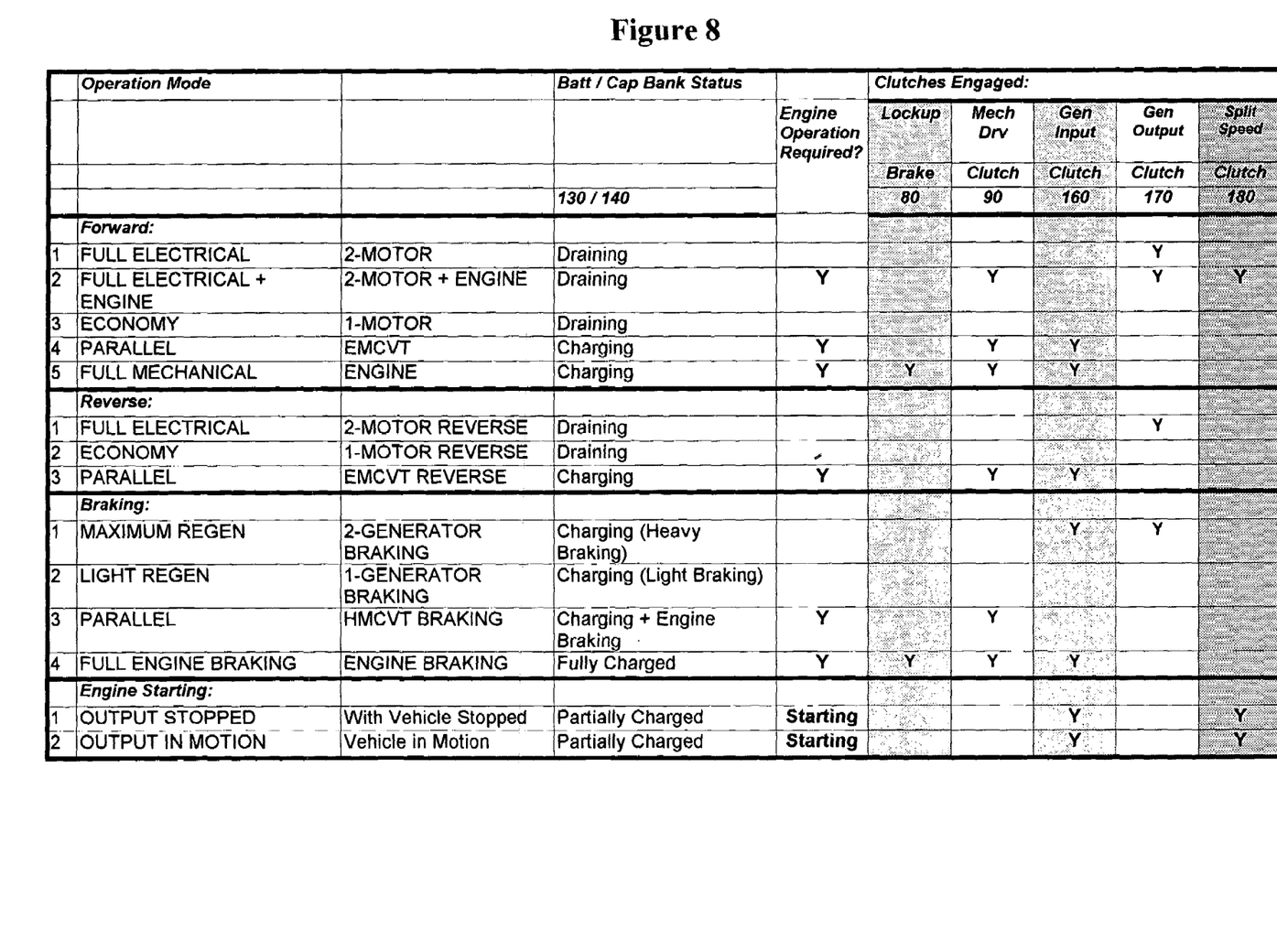
FIG. 8 shows a table listing the engine, brake and clutch configurations for various operating modes of the EMCVT.

Referring to FIG. 1 and FIG. 8, several modes of operation are possible but five forward power modes, three reverse power modes and four braking modes are deemed useful. During a typical duty cycle, the transmission may be switched several times between the available modes to optimize efficiency and output power.

The operating modes of the transmission are listed in the table in FIG. 8, along with engine, clutch and brake setting for each mode. These modes can be divided into four categories: Forward, Reverse, Braking and Engine Starting.

Forward Operation:

Five modes of operation are available for forward rotation of the output i.e. forward vehicle motion. Not all modes need be available for any given application of the EMCVT.

Forward Full Electrical Mode:

In forward full electrical mode, the generator output clutch 170 is engaged. The primary generator 22 and primary motor 24 both function as motors and draw energy stored in the capacitor and battery banks 140, 130. No engine power is drawn from the input 40 and the primary power source (engine) may be allowed to idle or may be shut off completely. This mode is best used for short periods of high torque output such as during initial startup and high acceleration to a higher speed. Electrical mode also drains the capacitor bank 140 and battery bank 130.

Forward Full Electrical+Engine Mode ("Burst" Mode):

In "Burst" mode, the engine is in operation and mechanical drive clutch 90, generator output clutch 170 and split speed clutch 180 are all engaged. The primary generator 22 and primary motor 24 both function as motors and draw energy stored in the capacitor and battery banks 140, 130. Engine power is drawn from input 40 and is delivered directly to the output shaft 26 through the planetary gear set 10 (with all elements locked by split speed clutch 180) and mechanical drive clutch 90. This mode is used to provide a maximum torque output for a short duration (burst) that exceeds that available from the main input 40 alone. Burst mode also drains the capacitor bank 140 and battery bank 130.

Forward Economy Mode:

In Economy mode, none of the clutches are engaged. Only the primary motor 24 is used to power the main output shaft 26. Energy is drawn from capacitor and battery banks 140, 130 to power motor 24. No engine power is drawn from the input 40 and the primary power source (engine) may be allowed to idle or shut off completely for maximum fuel savings. The duration of operation for this mode is determined by the capacities of battery and capacitor bank 130, 140. This mode is used to maximize fuel economy and/or to operate with minimum noise levels.

Forward Parallel Mode:

In parallel mode, the mechanical drive clutch 90 and generator input clutch 160 are engaged, and the engine is in operation. Power provided by the primary power source is drawn from the input 40 of the EMCVT and is split between the mechanical branch 21 and the electrical branch 20. Since the planetary gear set 10 divides input torque according to a fixed ratio, power is split according to the speed of the particular element connected to each branch. Initially, the mechanical branch 21 does not turn as it is directly connected to the output shaft 26. The primary generator 22 is forced to turn near its upper speed limit. The primary generator 22 produces electrical power that is directed by the controller to the primary motor 24. The primary motor 24 then forces the output shaft 26 to turn. Adjusting the current/frequency characteristics of the motor 24 and generator 22 varies the effective gear ratio of the electrical branch 20. At the lower half of the EMCVT speed band, power is transferred primarily electrically.

As the output speed increases, so does the speed of the mechanical branch 21. Since input speed is being held constant, the speed of the primary generator 22 must decrease. To do this, the effective gear ratio of the electrical branch 20 is altered by adjusting the current/frequency characteristics to reduce the power supplied by the primary motor 24 to the combiner gear set 28. The net result is that more of the input power is being delivered mechanically and less electrically.

Finally, near the upper end of the EMCVT's speed range, the primary generator 22 barely turns, producing very low power levels in the electrical branch 20 with power from input 40 being delivered to output 26 almost exclusively through the mechanical branch 21. Ideally, the primary generator 22 stops turning completely with only a holding torque generated against the corresponding planetary gear set 10 element. "Full Mechanical" mode, below, discusses how this unique stage of EMCVT operation can be achieved.

During intermediate stages of the RPM range, a small amount of electrical power (approximately 10%) can be diverted from the primary motor 24 and used to charge the battery bank 130. The stored energy is then available at a later time for other modes of operation as described above.

Parallel mode is the primary mode of operation for the majority of EMCVT applications and is designed for periods of medium power demands over varying output speed, i.e. conventional driving. Parallel mode allows the use of a smaller, more efficient primary power source (engine) to suit cruise power as well as reducing the size of the battery/capacitor bank compared to a conventional (non-parallel) hybrid internal combustion/electric drive.

Forward Full Mechanical Mode:

Mechanical Mode is an extension of the parallel mode. As stated above, in parallel mode, at the upper end of the EMCVT's speed range, the primary generator 22 barely turns and ideally should stop. Limitations of current motor/generator technology makes it impractical to hold the generator 22 at zero speed. In order to run the EMCVT in full mechanical mode, a lockup brake 80 is introduced to provide the torque reaction necessary against the planetary gear set 10 by locking the electric output element (sun gear 12 in SRC configurations) to ground, typically the outer casing of the transmission. As a result, the generator 22 is locked out and the mechanical branch 21 is responsible for supplying all the power to the output shaft 26. Otherwise, operation is the same as Parallel mode. Mechanical mode is designed for use when the EMCVT is operating near or at maximum speed for a period of time.

Reverse Operation:

Three modes of operation are available for reverse rotation of the output. Equivalents to the forward Burst mode and Mechanical mode are not available for reverse operation. Should the full range of forward modes be required for reverse operation, an optional geared reverse may be installed at the input 40 of the transmission. See "Optional Components" after this section.

Reverse Full Electrical Mode:

The generator output clutch 170 is engaged as described for forward Electrical mode above. The difference is that the generator 22 and motor 24 are run in reverse to effect reverse output. Electrical mode is used for short periods of reverse operation where high torque is required.

Reverse Economy Mode:

In Economy mode all clutches are disengaged as described for forward Economy mode above. The primary motor 24 is run in reverse to effect reverse output. Economy mode can be used for short periods of reverse operation with low power demands.

Reverse Parallel Mode:

In Parallel mode the mechanical drive clutch 90 and generator input clutch 160 are engaged as described for Forward Parallel mode above. Power provided by the primary power source (not shown) is drawn from the input 40 of the EMCVT and is split between the mechanical branch 21 and the electrical branch 20. In order to effect reverse output speed during Parallel mode, the primary motor 24 is used to reverse the main output shaft 26. The element of the planetary gear set 10 connected to the mechanical branch 21 (hence, the main output shaft 26) is forced to turn opposite to its normal (Forward mode) direction. The elements of the planetary gear set 10 connected to the input 40 and electrical branch 20 (primary generator 22) turn in the same direction as in Forward mode. Since the torque applied to each of elements of the planetary gear set 10 is in the same direction as in Forward mode, the resultant negative power flow in the mechanical branch 21 must be compensated for by increasing the power flow in the electrical branch 20. For the same output speed in reverse in Parallel mode, the electrical branch 20 must pass a greater amount of power than in forward. The components of the electrical branch 20 must either be increased in capacity or reverse must be limited to slow to medium speeds. During this mode, charging of the battery/capacitor banks 130, 140 may take place.

Parallel mode is the primary operating mode for the reverse direction and may be used for extended periods of reverse operation with medium power demands over varying slow to medium output speed or when little or no energy has been stored in the battery/capacitor banks 130, 140.

Braking Operation:

A significant advantage of the EMCVT over conventional transmissions is the use of regenerative braking—the recovery and storage of braking energy for later use. Conventional braking (retarding) systems reduce speed by removing kinetic energy from the vehicle or machine and dissipating it as heat. These conventional systems may consist of a mechanical, hydraulic or electromagnetic braking system. The EMCVT removes kinetic energy and stores it as electrical/chemical energy in the battery/capacitor banks 130, 140. A conventional braking system incorporated into the overall design may be greatly reduced in size since additional braking force can be provided by the transmission. Note that a mechanical braking system is not shown in any of the configurations but may be added if desired.

Four braking modes are available depending on the required braking force and state of charge of the battery/capacitor banks 130, 140.

Braking—Maximum Regeneration:

For maximum regenerative braking, the generator input clutch 160 and generator output clutch 170 are engaged. The input 40 (engine) does not apply or absorb any power and, in fact, may be shut off. Both primary motor 24 and primary generator 22 function as generators charging the battery/capacitor banks 130/140. Large amounts of kinetic energy are absorbed from the transmission output 26 until the battery/capacitor banks 130/140 are fully charged; braking ability in this mode is limited by the amount of energy that can be absorbed by the banks 130, 140. At that point, either a conventional braking system or Full Engine braking (described below) must be used.

Maximum regenerative braking is used during short periods of high braking loads such as a panic stop in a vehicle or an emergency shut-off of a stationary machine.

Braking—Light Regeneration:

For light regenerative braking, none of the clutches are engaged. Energy is handled as described in Maximum Regeneration Mode above except that only the primary motor 24 functions as a generator. As described above, the battery/capacitor bank 130, 140 capacity limits the amount of braking energy absorbed.

Light regeneration mode is used during short periods of low to medium braking alternating with "Economy Mode" in Forward or Reverse. An example would be a vehicle traveling in "stop and go" traffic.

Braking—Parallel:

In parallel braking mode, the mechanical drive clutch 90 is engaged, resulting in a power split between the engine input 40 and the electrical branch 20. As a result, the kinetic energy absorbed from the transmission output 26, can also be split. Part of energy can be converted as described above and stored by the battery/capacitor banks 130/140 and the balance is absorbed/dissipated by the engine (as in conventional engine braking).

Parallel mode is most suitable for, but not limited to, the situation in which braking energy to be absorbed/dissipated exceeds the storage capacity of the battery/capacitor banks 130, 140. An example of this would be controlling a heavy vehicle down an unusually steep grade.

Braking—Full Engine Mode:

In full engine braking mode, the lockup brake 80 is engaged in addition to mechanical drive clutch 90 and generator input clutch 160. Kinetic energy is absorbed from the transmission output 26 and dissipated by the engine alone in the same fashion as conventional engine braking. This mode may be applied when the battery/capacitor bank 130, 140 is full and maximum braking is required.

Engine Starting

As mentioned above, the duty cycle of the transmission may require cycling through the different modes many times. In order to realize maximum fuel economy the primary power source (engine) should be shut off during modes where it is not required (full electrical and economy modes with regenerative braking). This is especially true if the primary power source happens to be an internal combustion engine. Of course, the primary power source will then need to be started or restarted to enter one of the other operating modes.

A conventional engine starter motor could be used but it has two major drawbacks: the engine cannot be started near its operating speed and the starter motor does not have the duty cycle required for the high frequency of engine restarts. By using the primary generator 22 as a starting motor for the engine, no extra components are added and the engine can be cranked near its required operating speed, which reduces emissions and increases fuel economy.

Starting—Output Stopped:

With the main output shaft 26 stopped, the generator input clutch 160 and split speed clutch 180 are engaged. The primary generator 22 functions as a motor, drawing stored energy from the battery/capacitor bank 130, 140. Since all other brakes and clutches are disengaged, the primary generator 22 is able to turn the engine through the planetary gear set 10, which has its elements locked together by the split speed clutch 180. Once the engine is operating, the split speed clutch 180 is disengaged and any of the Forward/Reverse modes engaged.

Starting—Output in Motion:

From a condition where the EMCVT is initially in one of the forward/reverse modes listed in table 1 where the engine is off and output shaft 26 is in motion, the generator input clutch 160 and split speed clutch 180 are engaged. The primary generator 22 operates as a starting motor for the engine. Once the engine is operating, the transmission is switched to one of the forward/reverse modes listed in FIG. 8 where the engine is on.

Alternatively, the EMCVT can operate in either Forward or Reverse Parallel mode and use the energy stored in the battery/capacitor bank 130, 140 to maintain power to output shaft 26 as well as providing power to start the engine.

Optional Components

Geared Reverser:

As stated in the section "Reverse Operation", the full range of forward modes is not normally available in reverse. This suits most conventional vehicles and industrial applications where the performance demand for reverse operation is very low or not required at all. However, some applications may require all forward modes of operation (including all braking modes) in reverse. A simple solution to this problem is to install a geared reverser at either the input 40 or the output 26 of the EMCVT.

Figure 9:
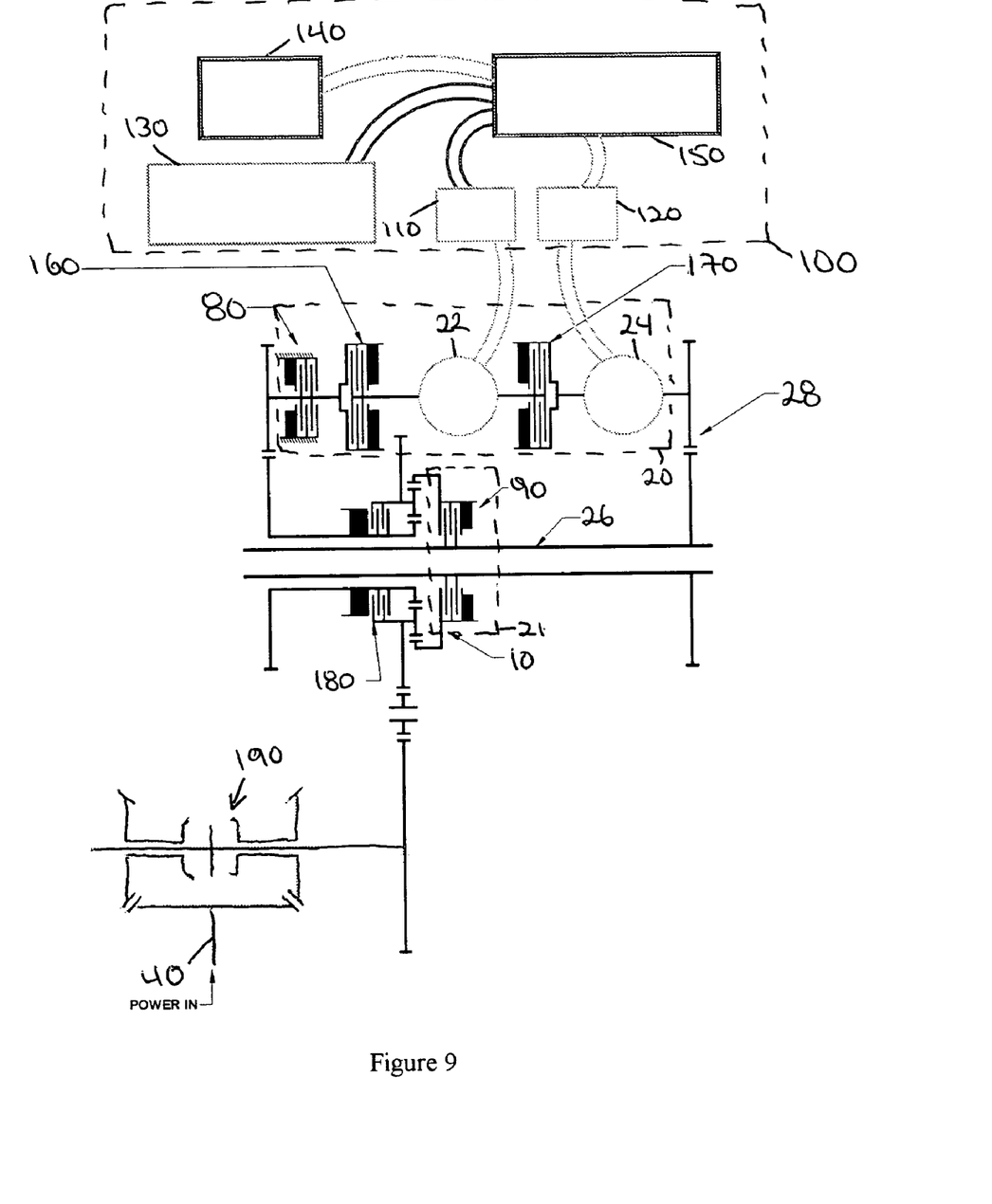
FIG. 9 shows a block diagram of the EMCVT of FIG. 1 with a geared reverser coupled to the power input.

Placing a reverser 190 at the input 40 of the transmission as shown in FIG. 9 simply reverses the direction of all the components downstream of the input 40. Since all speed and torque directions have been reversed, there is no negative power flow through any branch. The transmission will operate using any of the forward modes but with reverse output rotation.

An alternative (not shown) is to place the reverser 190 at the output 26. The result is that the transmission components turn in one direction only regardless of final output direction. The major drawback to an output reverser is the higher torque requirements placed on the reverser components compared to a reverser installed at the transmission input 40. The resultant increase in size and weight makes the input reverser a better choice. Since the transmission serves to increase the torque available at the transmission input, a reverser installed at the output 26 must be much stronger than one installed at the input 40. The resulting increase in weight and complexity would make an output reverser unsuitable for the majority of applications.

Figure 5:
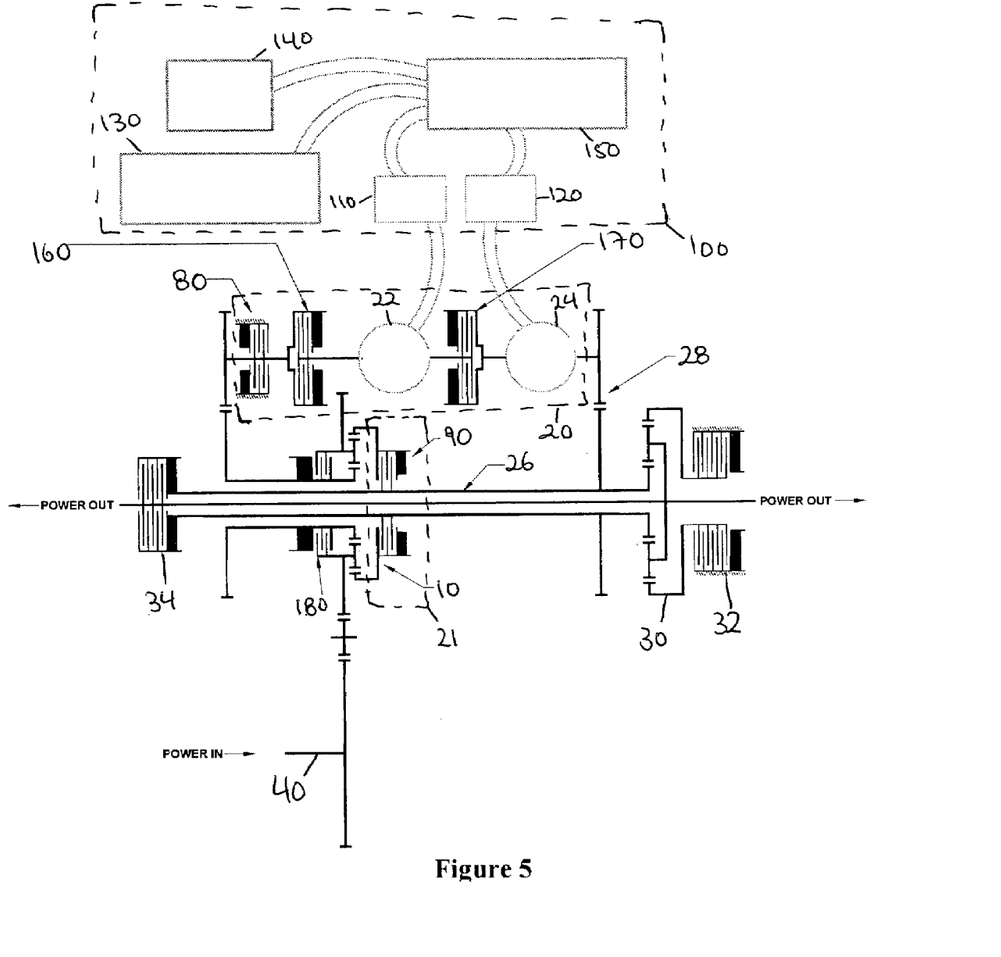
FIG. 5 shows a block diagram of the EMCVT of FIG. 1 with a two-speed range doubler.

Range Splitter:

Due to the limitations of current generator/motor technology, a range splitter or doubler may be incorporated at the main output shaft 26 to increase the operating envelope of the transmission. FIG. 5 shows a parallel shaft EMCVT with a two-speed range splitter based on a planetary gear set 30 and a low-speed 32 and high-speed 34 clutch. The two-speed range splitter suits most applications although a three (or more) speed range splitter could also be incorporated if necessary.

Figure 6:
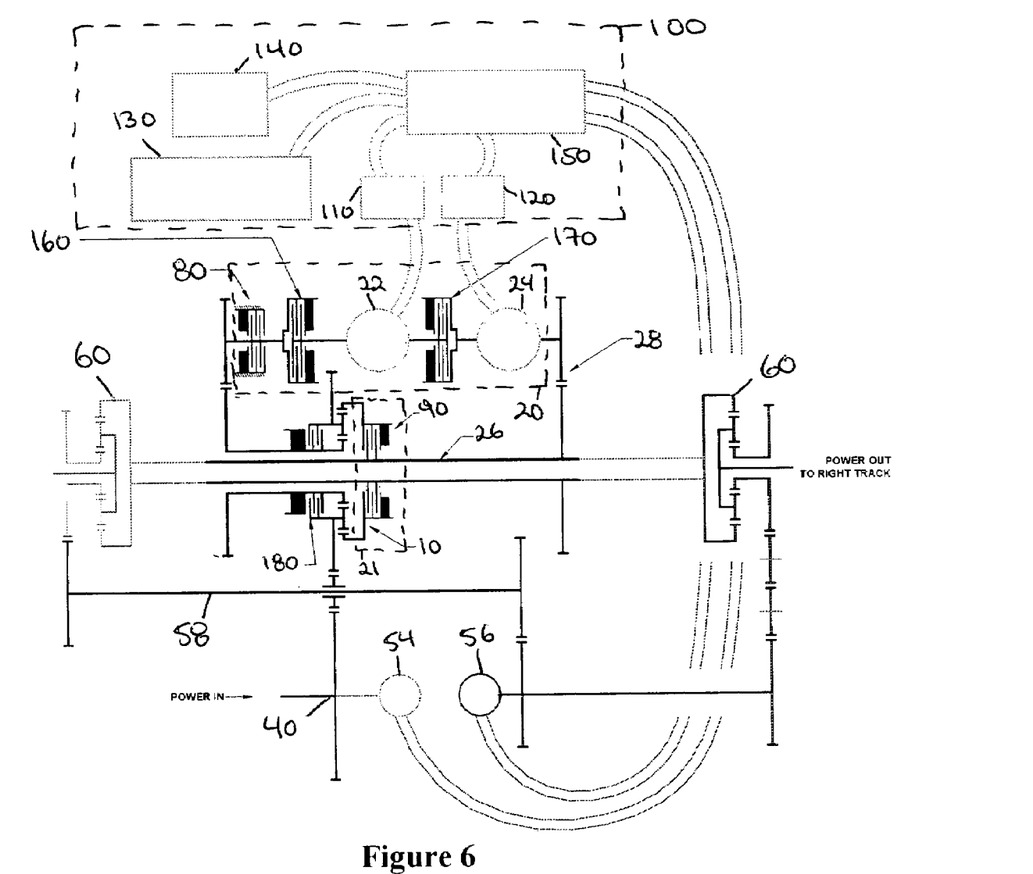
FIG. 6 shows a block diagram of the EMCVT of FIG. 1 with a regenerative steering system.
Figure 7:
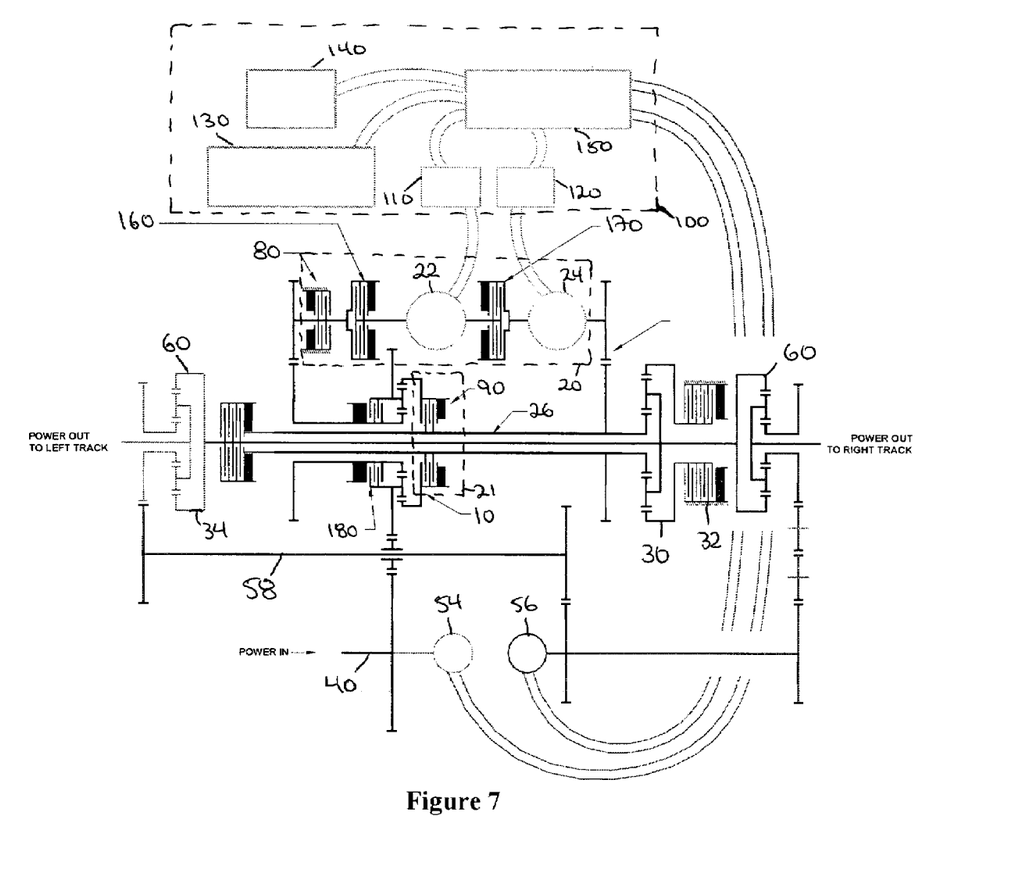
FIG. 7 shows a block diagram of the EMCVT of FIG. 1 with a two-speed range doubler and a regenerative steering system.

Regenerative Steering System:

When the EMCVT is used to drive a tracked vehicle with two outputs, precise steering may be accomplished with a regenerative steering system as shown in FIG. 6. If one output is required to turn slower than the other output, power is transferred from the slower side to the faster side rather than being bled off as heat as in a conventional brake-to steer system.

The steering generator 54 is driven either directly by or thru idlers by the input 40 of the transmission. When the power split is equal between outputs, the zero shaft 58 is prevented from turning by the steering motor 56 and the outputs of the steering planetaries 60 turn at the same speed. If more power is required to turn one output faster than the other, the steering motor 56 turns the zero shaft 58 in one direction or the other changing the relative speeds of the steering planetary 60 outputs. Alternatively, the steering generator 54 may be omitted with power supplied to the steering motor 56 from the battery/capacitor banks 130/140, the primary generator 22, the primary motor 24 or a combination of these elements.

Another considerable advantage of the EMCVT lies in the ability of the configured systems as shown in FIGS. 1 and 3 to enable a driven output on both ends of the transmission via a common output shaft 26. This is particularly useful in vehicles or stationary equipment that require duplicated output shafts to two drives such as tracks and/or differentials. Furthermore, one or both of the outputs can be engaged or disengaged eliminating the need for a transfer case when configured for multiple output drives.

The EMCVT speed can be controlled in any conventional manner, however an electronic control system is preferred to best optimize the power splitting in connection with the output speed when operating in either forward or reverse Parallel mode. Furthermore, the electronic control system can also include control means for the optional range splitter and regenerative steering system as well as the various clutches and brakes discussed above.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the scope of the invention.

What is claimed is:

1. An electro-mechanical continuously variable transmission comprising:
   (a) an input shaft to receive power from an engine;
   (b) an output shaft;
   (c) a generator;
   (d) a planetary gear set coupled to said input shaft, to said output shaft and to an input of said generator;
   (e) a motor coupled to said output shaft by a gear set having a fixed speed ratio;
   (f) an energy storage device coupled to said generator and to said motor and operative to accept power from and supply power to said generator and to said motor;
   (g) a controller coupled to said motor, generator and battery is operative to regulate power flow between said energy storage device and said generator, said energy storage device and said motor and between said generator and said motor;
   (h) a split speed clutch coupled to two elements of said planetary gear set and operative to lock said two elements together and permit direct transfer of all power between said generator and said input shaft;
   (i) a generator lockup brake coupled to said generator and operative to lock said generator from rotating;
   (j) a generator output clutch coupled between said generator and said motor and operative in a locked mode to lock said generator to said motor; and
   (k) a mechanical drive clutch coupled between one element of said planetary gear set and said output and operative to lock together the one element of said planetary gear set to said output allowing said planetary gear set to split power between said generator, said input shaft and said output shaft.

2. The transmission of claim 1, further including a range splitter coupled to said output shaft to enable two or more separate operating ranges for said transmission.

3. The transmission of claim 1, further including a regenerative steering system operative to split power between output ends when said main output shaft is used to provide drive force at two ends of said main output shaft.

4. The transmission of claim 1, further including a regenerative braking system to enable energy from braking to be stored in said energy storage unit.

5. The transmission of claim 1, wherein said generator and motor are arranged around a shaft parallel to said main output shaft.

6. The transmission of claim 1, wherein said generator and motor are arranged coaxially around said main output shaft.

7. The transmission of claim 1, wherein said generator and motor are arranged coaxially around said main output shaft and said main power input is at one end of said main output shaft.

8. The transmission of claim 1, further including a reverse gear system coupled to said main power input which reverse the output direction of said transmission.

9. The transmission of claim 1, further including a reverse gear system coupled to said main output shaft operative to reverse the output direction of said transmission.

10. The transmission of claim 1, wherein said split speed clutch is engaged, allowing said generator to act as a starting motor and send power to said input.

* * * * *